US012614876B2

(12) United States Patent
Boemmel et al.

(10) Patent No.: US 12,614,876 B2
(45) Date of Patent: Apr. 28, 2026

(54) HOUSING ASSEMBLY FOR AN ELECTRIC CONNECTOR WITH A MATING AID AS WELL AS ELECTRIC CONNECTOR AND CONNECTOR ASSEMBLY

(71) Applicant: TE Connectivity Germany GmbH, Bensheim (DE)

(72) Inventors: Christian Boemmel, Bensheim (DE); Juergen Sauer, Bensheim (DE); Torsten Sieler, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 247 days.

(21) Appl. No.: 18/361,002

(22) Filed: Jul. 28, 2023

(65) Prior Publication Data

US 2024/0039211 A1 Feb. 1, 2024

(30) Foreign Application Priority Data

Jul. 28, 2022 (DE) ......................... 102022118993.7

(51) Int. Cl.

*H01R 13/629* (2006.01)
*H01R 13/436* (2006.01)
*H01R 13/639* (2006.01)

(52) U.S. Cl.

CPC ... *H01R 13/62933* (2013.01); *H01R 13/4362* (2013.01); *H01R 13/639* (2013.01)

(58) Field of Classification Search

CPC ............ H01R 13/502; H01R 13/62938; H01R 13/4362; H01R 13/6271; H01R 13/639; H01R 13/62933; H01R 13/629

See application file for complete search history.

(56) References Cited

U.S. PATENT DOCUMENTS

| | | | | |
|---|---|---|---|---|
| 6,793,522 | B2 * | 9/2004 | Yamashita | H01R 13/6295 439/157 |
| 2018/0342834 | A1 * | 11/2018 | Amerio | H01R 13/62955 |
| 2019/0081438 | A1 * | 3/2019 | Yamane | H01R 13/44 |

FOREIGN PATENT DOCUMENTS

| | | | |
|---|---|---|---|
| EP | 3249759 | A1 | 11/2017 |
| FR | 2962857 | A1 | 1/2012 |

(Continued)

OTHER PUBLICATIONS

English translation of JP 2010146950 (Year: 2025).*

(Continued)

*Primary Examiner* — Tho D Ta
*Assistant Examiner* — Carlos E Lopez-Pagan
(74) *Attorney, Agent, or Firm* — Barley Snyder

(57) ABSTRACT

A housing assembly for an electrical connector that can be plugged together with a mating connector along a plugging direction includes a connector housing, a mating aid arranged on the connector housing and movable between an initial position and a final position, and a securing element arranged on the mating aid and movable between a secured position and a release position. The mating aid has a drive section engaging the mating connector to move the mating connector into a state in which the mating connector is plugged together with the electrical connector. The securing element in the secured position engages the connector housing and in the release position is disengaged from the connector housing. The securing element in the secured position is accessible for the mating connector from outside of the housing assembly and is movable to the release position by the mating connector.

18 Claims, 6 Drawing Sheets

(56) References Cited

FOREIGN PATENT DOCUMENTS

| | | | | | |
|---|---|---|---|---|---|
| JP | H07220805 | A | | 8/1995 | |
| JP | 200322874 | A | | 1/2003 | |
| JP | 2010146950 | A | * | 7/2010 | ....... H01R 13/62961 |
| WO | 2012007343 | A1 | | 1/2012 | |
| WO | 2021028294 | A1 | | 2/2021 | |

OTHER PUBLICATIONS

English translation of JP2010146950A (Year: 2025).*
Office Action from Deutsches Patent- und Markenamt dated May 17, 2023, corresponding to Application No. 10 2022 118 993.7, 7 pages.
Korean Office Action dated Sep. 25, 2024 with English translation, corresponding to Application No. 10-2023-0098093, 16 pages.
Extended European Search Report dated Dec. 6, 2023, corresponding to Application No. 23188122.8-1201, 10 pages.
European Patent Office Examination Report dated Dec. 16, 2025, corresponding to Application No. 23 188 122.8-1201, 11 pages.
Indian Office Action dated Jan. 28, 2026, corresponding to Application No. 202344049932, 8 pages.

* cited by examiner

HOUSING ASSEMBLY FOR AN ELECTRIC CONNECTOR WITH A MATING AID AS WELL AS ELECTRIC CONNECTOR AND CONNECTOR ASSEMBLY

CROSS-REFERENCE TO RELATED APPLICATIONS

This application claims the benefit of the filing date under 35 U.S.C. § 119(a)-(d) of German Patent Application No. 102022118993.7, filed on Jul. 28, 2022.

FIELD OF THE INVENTION

The present invention relates to a housing assembly for an electrical connector with a mating aid. The present invention furthermore relates to an electrical connector with such a housing assembly as well as a connector assembly with such an electrical connector.

BACKGROUND

Electrical connectors are used in electrical circuits for detachable plug connections for the transmission of electrical currents and/or signals between components that are part of the electrical circuit. During a plugging process for establishing or releasing the plug connection, considerable resistance forces counteracting the plugging process in a hindering manner may have to be overcome. Furthermore, restricted accessibility of the electrical connector can make the plugging process more difficult. In order to avoid productivity losses when assembling the plug connection, the use of a mating aid for mechanical assistance and simplification of the plugging process, for example, in automotive engineering, is advisable. The mating aid is operated manually after the electrical connector has been placed onto the mating connector.

Conventional mating aids are often attached to the electrical connector to be freely movable so that they are randomly present in different positions during the delivery to the installation site. Depending on the position of the mating aid, it can be that the mating aid takes up an unnecessarily large amount of space and/or has to be made to assume a correct initial position prior to the plugging process. This pre-positioning in particular represents additional manipulation that is required, which has a negative impact in particular on the productivity of line productions.

Any securing elements with which the mating aid is locked in the correct initial position take up additional space and/or must also be disengaged in advance in a further work step. Conventional securing elements therefore do not provide any significant cost savings.

There is therefore a need for a plug connection with a mating aid that takes up as little space as possible and can be operated in a simple as well as effective manner with as few manipulations as possible.

SUMMARY

A housing assembly for an electrical connector that can be plugged together with a mating connector along a plugging direction includes a connector housing, a mating aid arranged on the connector housing and movable between an initial position and a final position, and a securing element arranged on the mating aid and movable between a secured position and a release position. The mating aid has a drive section engaging the mating connector to move the mating connector into a state in which the mating connector is plugged together with the electrical connector. The securing element in the secured position engages the connector housing and in the release position is disengaged from the connector housing. The securing element in the secured position is accessible for the mating connector from outside of the housing assembly and is movable to the release position by the mating connector.

BRIEF DESCRIPTION OF THE DRAWINGS

The invention shall be explained hereafter in more detail with reference to the drawings on the basis of several embodiments, the different features of which may be combined with one another as required, where.

DETAILED DESCRIPTION OF THE EMBODIMENTS

With reference to FIGS. 1 to 11, the schematic structure of a housing assembly 1 according to the invention, of an electrical connector 2 according to the invention, and of a connector assembly 4 according to the invention shall be explained hereafter.

Figure 1:
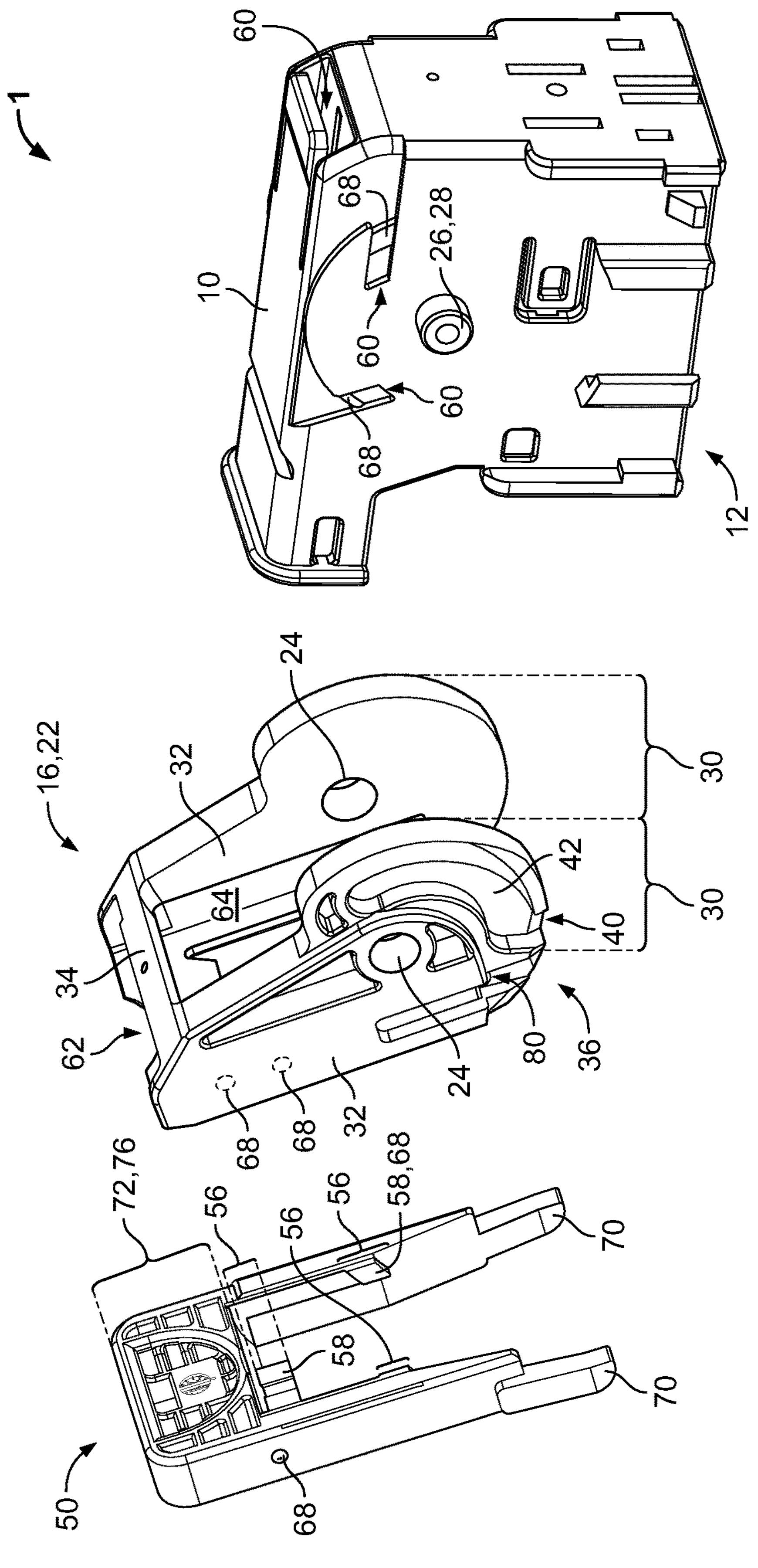
FIG. 1 is an exploded perspective view of a housing assembly according to an embodiment.
Figure 2:
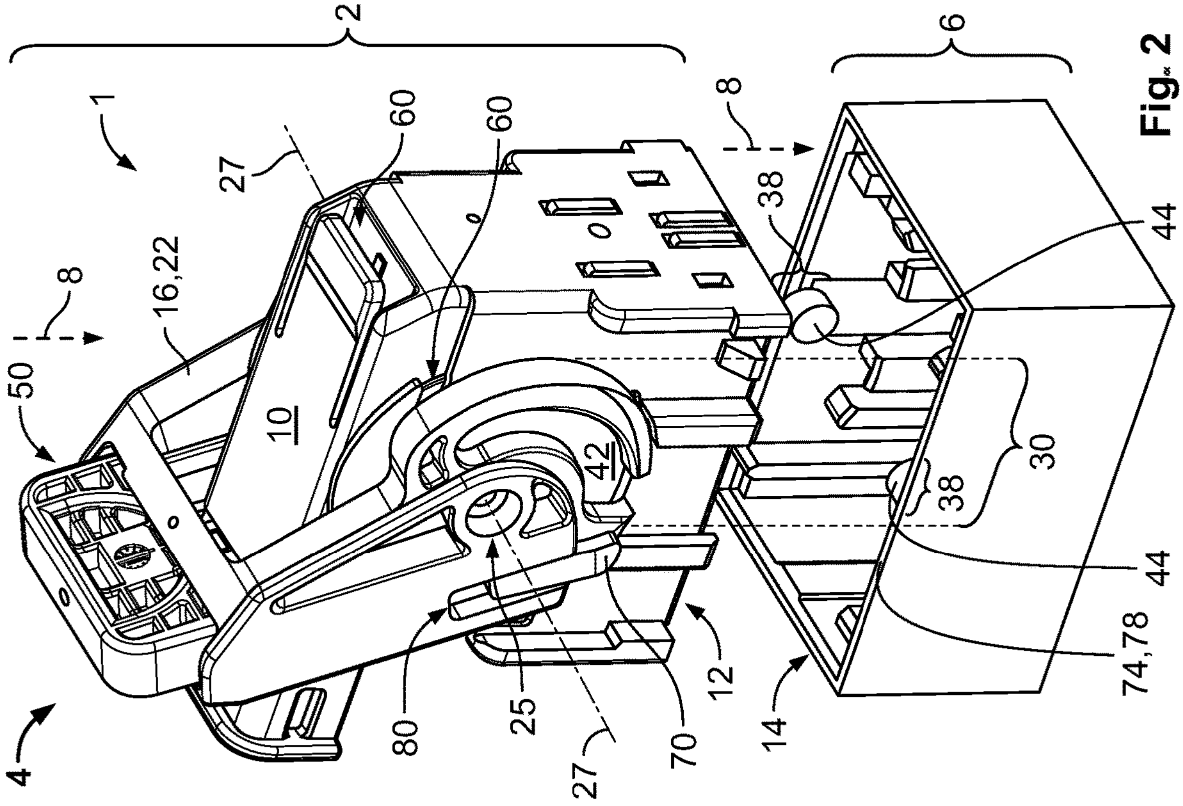
FIG. 2 is a perspective view of a connection assembly with the housing assembly of FIG. 1.

FIG. 1 shows an exemplary embodiment of housing assembly 1 according to the invention for an electrical connector 2 that can be plugged together with a mating connector 6 along a plugging direction 8 (see FIG. 2). As shown in FIG. 1, housing assembly 1 comprises a connector housing 10 with a mating face 12 pointing in plugging direction 8. Mating face 12 is configured to be complementary to a mating socket 14 of mating connector 6. Alternatively, connector housing 10 of electrical connector 2 can likewise have mating socket 14 and mating connector 6 can have a mating face 12 configured complementary thereto.

Housing assembly 1 comprises a mating aid 16, shown in FIG. 1. Mating aid 16 is configured to be arranged in a movable manner on connector housing 10. In particular, mating aid 16 in the state attached to connector housing 10 can be moved between an initial position 18 (see FIG. 4) and a final position 20 (see FIG. 8).

In the embodiment shown, mating aid 16 is configured as a control lever 22 which can be or is arranged to be pivotable on connector housing 10. For this purpose, control lever 22 has at least one bearing hole 24 into which a bearing pin 26 provided on connector housing 10 can be or is inserted. Bearing pin 26 can be a cylindrical stub axis 28 that fits into at least one bearing hole 24. Control lever 22 can be mounted by way of at least one bearing hole 24 to be rotatable on bearing pin 26.

In the embodiment shown, control lever 22 has two bearing holes 24 and connector housing 10 has two bearing pins 26 which are each arranged opposite one another perpendicular to plugging direction 8. The arrangement of the bearing holes 24 and bearing pins 26 can also be reversed, of course, between control lever 22 and connector housing 10. In pairs, bearing holes 24 and bearing pins 26 together result in a hole bearing 25, a pivot bearing, a sliding bearing or a tribological pairing with cylindrical contact surfaces, respectively. Control lever 22 can therefore be connected to connector housing 10 to be pivotable about a stationary pivot axis 27 which may run perpendicular to plugging direction 8.

Control lever 22 has at least one lever arm 32. Control lever 22, in an embodiment, has two lever arms 32 running parallel and in a mirror-symmetrical manner to one another which are connected to one another in a motion-transmitting manner by way of a connecting member 34. Optionally, lever arms 32 are monolithically connected to connecting member 34, in particular monolithically in one piece.

Alternatively, control lever 22 can be designed to have several parts, for example, three parts. In particular, control lever 22 can be composed of three segments, wherein two segments form lever arms 32 and a third segment connects lever arms 32 in the manner of a bridge.

Due to its U-shaped structure, control lever 22 can engage around connector housing 10. Bearing holes 24 are located on ends 36 of respective lever arms 32 facing away from connecting member 34 in an aligned arrangement perpendicular to plugging direction 8.

As can furthermore be seen from FIG. 1, mating aid 16 has at least one drive section 30, which can be made to engage with mating connector 6, for moving mating connector 6 into a state in which it is plugged together with electrical connector 2. At least one drive section 30 can be rotatable about pivot axis 27. Mating connector 6 in turn has at least one driven section 38 arranged such that it can be made to engage with at least one drive section 30 of mating aid 16 (see FIG. 2).

At least one drive section 30 and at least one driven section 38 can there each form part of a link guide 40, shown in FIG. 1. In particular, at least one drive section 30 can form a groove-shaped link track 42 in which a sliding block 44 formed by at least one driven section 38 is positively guided. Alternatively, at least one drive section 30 and at least one driven section 38 can each form part of a gear. For example, at least one drive section 30 forms a gear segment 46, while at least one driven section 38 forms a rack segment 48 (see FIG. 11).

Mating aid 16, in an embodiment, has two drive sections 30 which are each arranged opposite one another perpendicular to plugging direction 8. A driven section 38 may be provided on mating connector 6 for each drive section 30 of mating aid 16.

In initial position 18 of mating aid 16, drive sections 30 are accessible to mating connector 6, in particular, to driven sections 38. Furthermore, drive sections 30 can be configured to carry out a drive motion when mating aid 16 is transferred from initial position 18 to the final position 20. This drive motion can be used to move mating connector 6 to the state fully plugged together with electrical connector 2.

As can also be seen in FIG. 1, housing assembly 1 has a securing element 50. Securing element 50 is configured to be arranged to be movable on mating aid 16. In particular, securing element 50 in a state of being attached to mating aid 16 can be moved between a secured position 52 (see FIGS. 4 and 6) and a release position 54 (see FIGS. 5 and 7).

Figure 6:
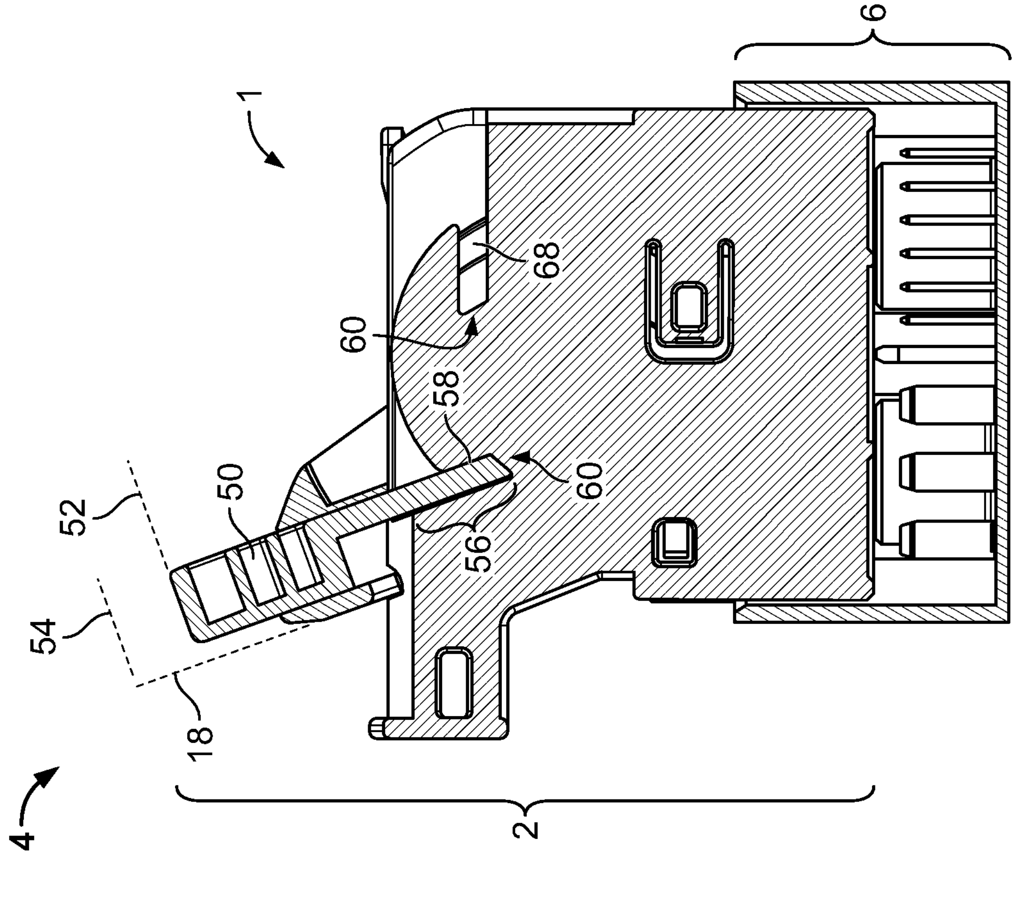
FIG. 6 is a sectional side view of the connection assembly of FIG. 3.
Figure 8:
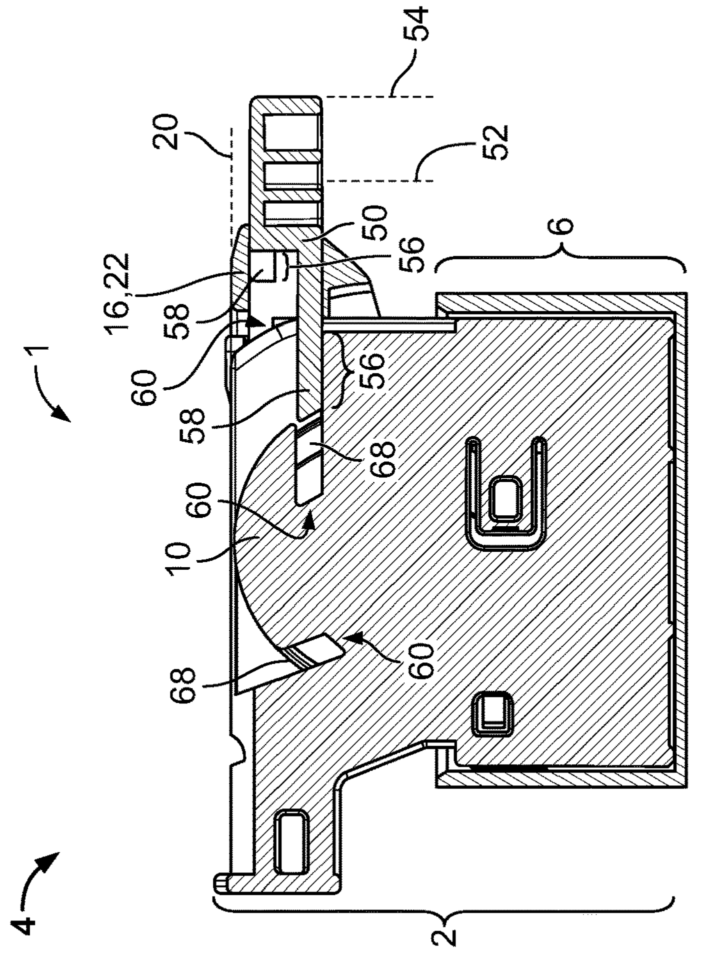
FIG. 8 is another sectional side view of the connection assembly of FIG. 3.
Figure 9:
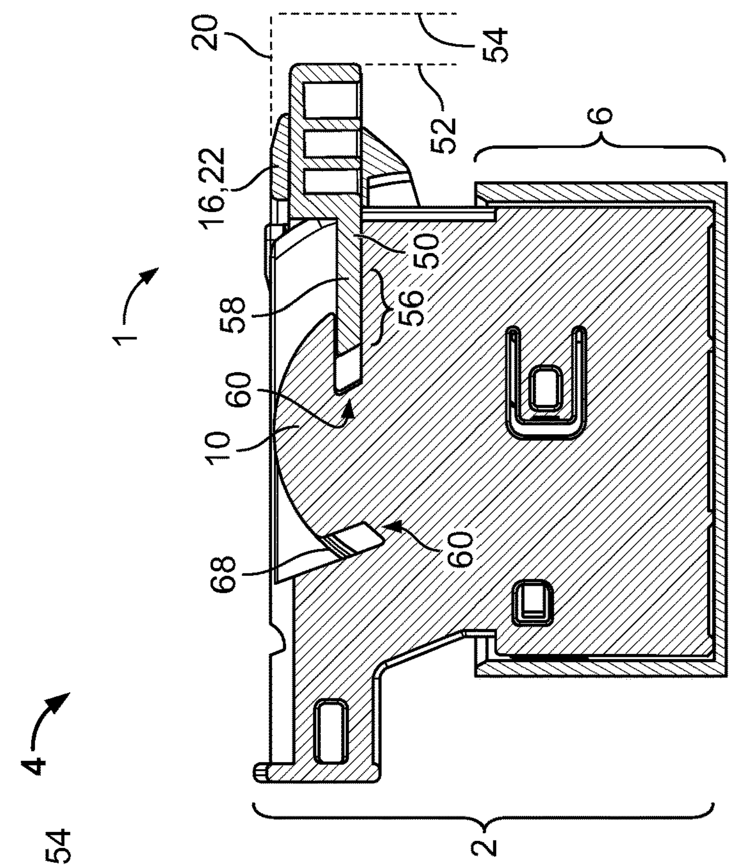
FIG. 9 is another sectional side view of the connection assembly of FIG. 3.
Figure 11:
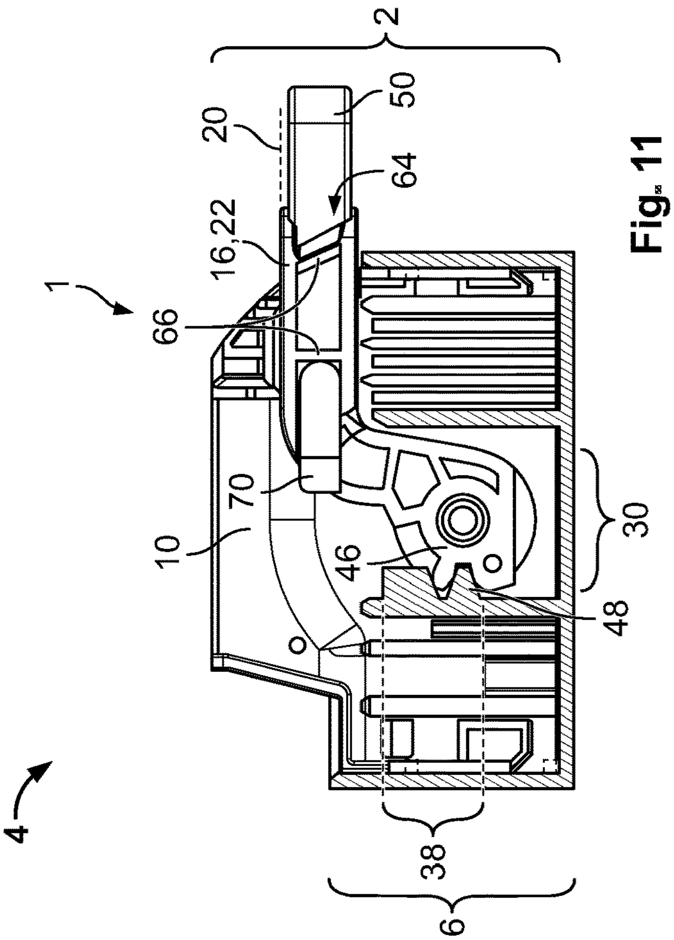
FIG. 11 is a sectional side view of a connection assembly according to another embodiment.
Figure 10:
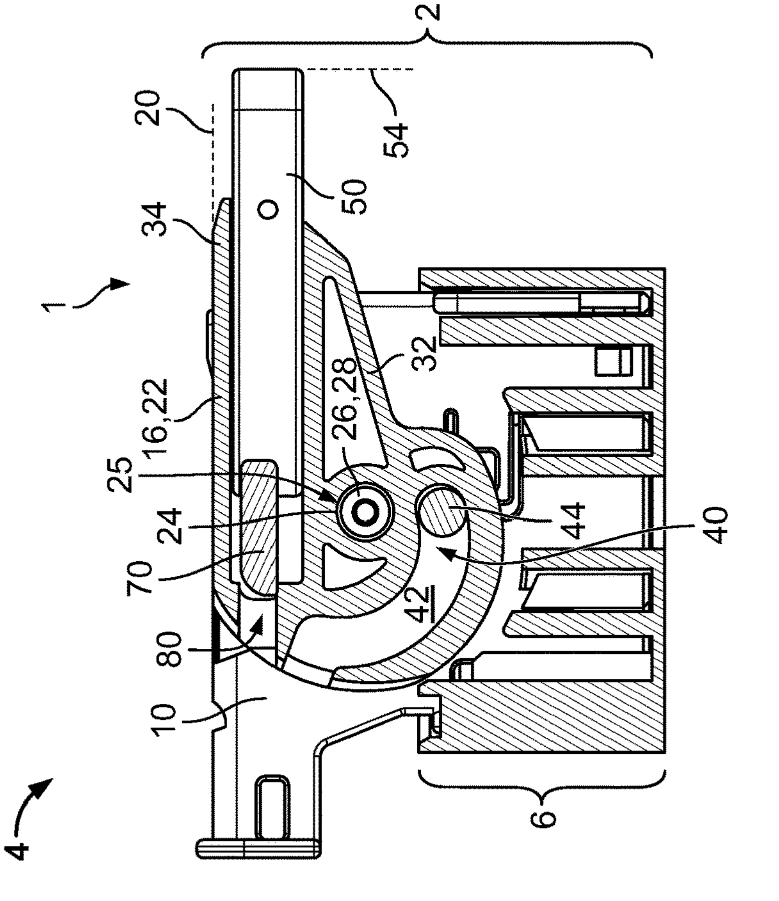
FIG. 10 is a sectional side view of the connection assembly of FIG. 3 in a different sectional plane.

In its secured position 52, securing element 50 is in engagement with connector housing 10 (see FIG. 6). For this purpose, securing element 50 has at least one locking section 56, wherein at least one locking section 56 and connector housing 10 engage with one another in a positive-fit manner when securing element 50 is in secured position 52. For example, at least one locking section 56 is formed as a catch 58 protruding towards connector housing 10. Correspondingly, a locking groove 60 of complementary configuration, into which catch 58 moves when securing element 50 is made to assume secured position 52, is provided on connector housing 10.

In its release position 54, securing element 50 is disengaged from connector housing 10. In other words, catch 58 leaves locking groove 60 when securing element 50 is made to assume release position 54. This can be seen in FIG. 7.

In this way, mating aid 16 can be specifically secured or locked in initial position 18 by securing element 50 disposed in secured position 52 (see FIG. 6). Alternatively or additionally, mating aid 16 can likewise be secured in final position 20 by securing element 50 disposed in secured position 52. The securing element 50 can therefore function as a connector position assurance (short CPA), which ensures that the fully plugged state is given and is maintained between the electrical connector and mating connector.

FIGS. 6 to 9 show that mating aid 16 can be secured by securing element 50 both in initial position 18 as well as in final position 20. In particular, one and the same locking section 56 secures initial position 18 and final position 20 of mating aid 16. For this purpose, connector housing 10 has one respective locking nut 60 for initial position 18 and one for final position 20. Depending on the position of mating aid 16, locking section 56 configured as a catch 58 is then brought into engagement with associated locking groove 60. Alternatively, securing element 50 can have a locking section 56 for securing mating aid 16 in the initial position and a further locking section 56 for securing mating aid 16 in the final position.

Alternatively, the securing element 50 can secure the initial and the final position of the mating aid 16 with one and the same locking section. Depending on the position of the mating aid 16, this locking section is then made to engage with the connector housing 10 at different points in order to secure the mating aid 16 at the respective point.

As can also be seen from FIGS. 6 to 9, securing element 50 can be moved with and relative to mating aid 16. In other words, securing element 50 can follow mating aid 16 by being moved along with mating aid 16. Securing element 50 is there guided in a straight line at least in sections in mating aid 16. For example, mating aid 16 can be penetrated at least in sections by securing element 50, wherein mating aid 16 has a channel-shaped guide 62 (see FIG. 1) into which securing element 50 is plugged at least in sections. The securing element 50 can therefore follow the mating aid 16 by being moved along with the mating aid 16. Due to the relative movability, the securing element 50 can then secure the mating aid 16 in its different positions (i.e. initial position and final position) as required.

Alternatively, securing element 50 can be guided in a straight line at least in sections on the outside of mating aid

16. For this purpose, mating aid 16 can have at least one groove 64 into which securing element 50 is inserted and guided at least in sections (see FIG. 11). Optionally, crossbars can 66 extend transverse to at least one groove 64 and hold securing element 50 therein.

Securing element 50 can be configured such that it can be latched in secured position 52 and in release position 54 on connector housing 10. For this purpose, mutually complementary latch elements 68 (e.g. pressure points or latching beads) can be provided on securing element 50 as well as on connector housing 10, which latch together in the respective position (i.e. secured position 52 and release position 54).

Additionally or alternatively, securing element 50 an be configured such that it can be latched on mating aid 16 in secured position 52 and/or release position 54. Accordingly, latch elements 68 can also be provided on mating aid 16 and latch in the respective position (i.e. secured position 52 and release position 54) with latch elements 68 of securing element 50 provided for this purpose.

Figure 3:
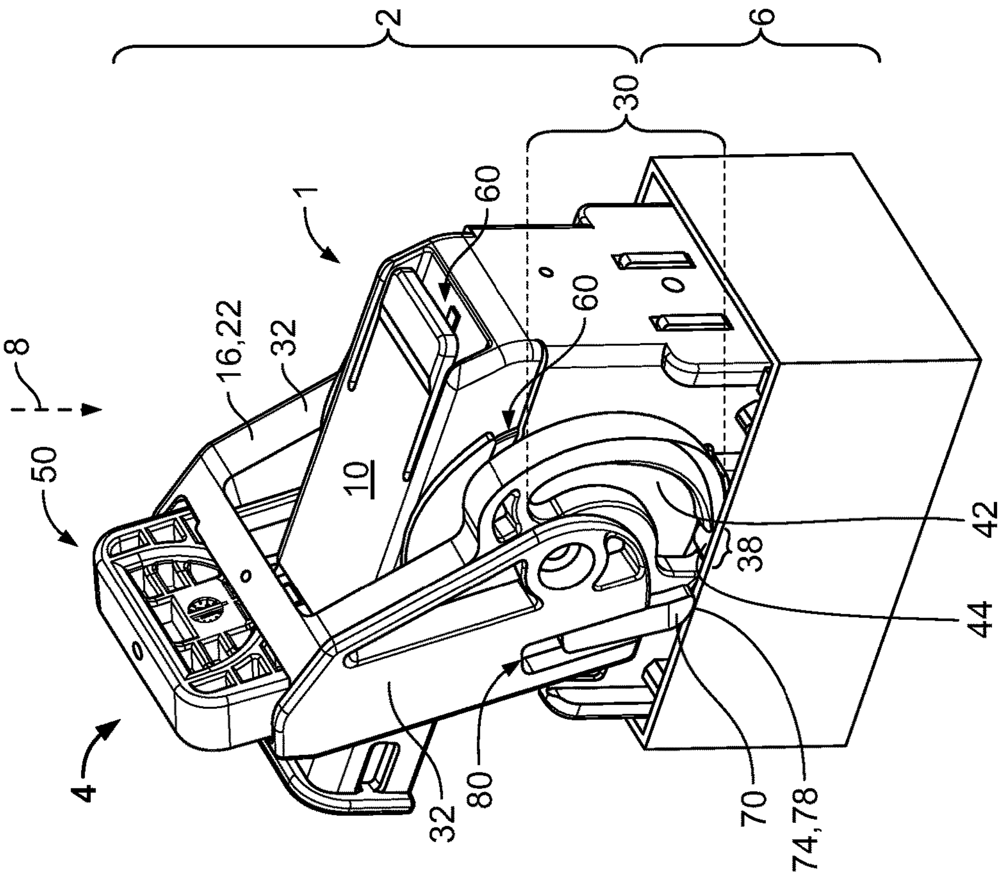
FIG. 3 is a perspective view of the connection assembly of FIG. 2.

It is clear from FIGS. 2 and 3 that securing element 50 is arranged in secured position 52 so that it is accessible to mating connector 6 from outside housing assembly 10. For this purpose, securing element 50 in secured position 52 protrudes from mating aid 16. Securing element 50 protrudes from mating aid 16 pointing in plugging direction 8 in particular when mating aid 16 is disposed in initial position 18. For this purpose, securing element 50 has at least one finger-like, pin-like, or prong-like projection 70 which in secured position 52 of securing element 50 protrudes from mating aid 16 being in initial position 18, points in plugging direction 8 towards mating face 12, and is arranged to be accessible to mating connector 6. Mating aid 16 has at least one slot 80 through which at least one projection 70 of securing element 50 protrudes.

Figure 5:
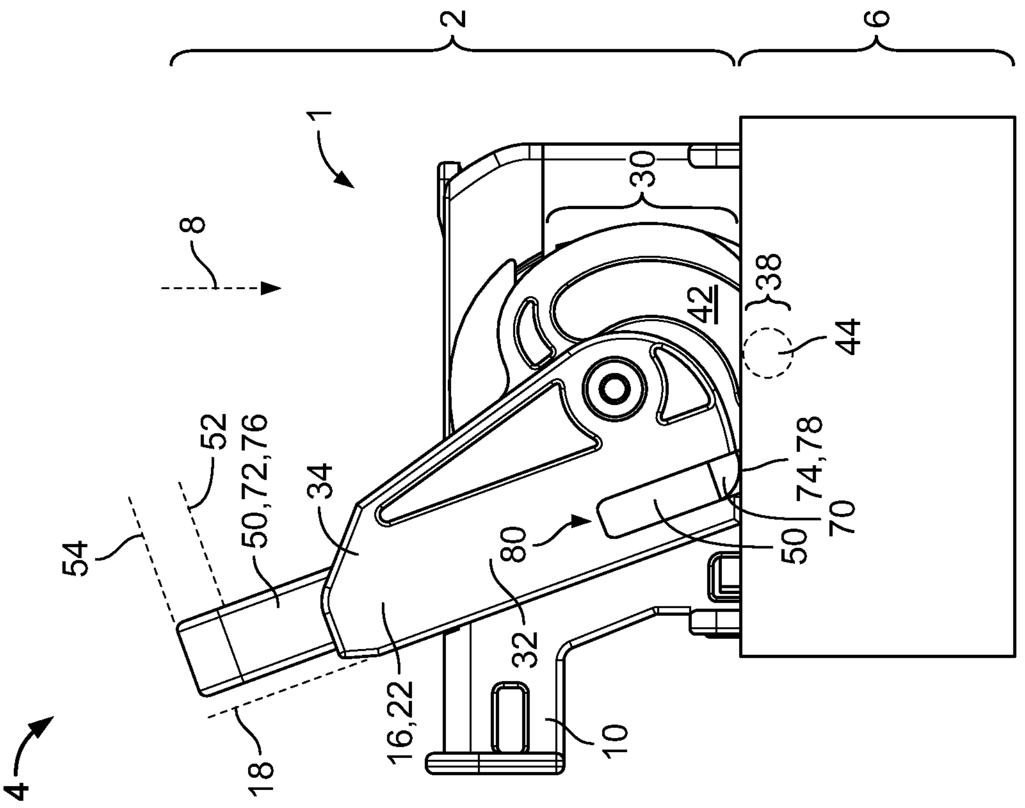
FIG. 5 is another side view of the connection assembly of FIG. 3.

Consequently, mating connector 6 can engage at at least one projection 70 in the initial phase of being plugged together (see FIG. 4) and thus push entire securing element 50 from secured position 52 to release position 54 for the purpose of automatically unlocking mating aid 16 (see FIG. 5).

The securing element 50, in particular the at least one projection 70 of the securing element 50, may protrude adjacent to the at least one drive section 30 of the mating aid 16 when viewed perpendicular to the plugging direction. Consequently, the mating connector 6 in the initial phase of plugging process can engage at the at least one projection 70 and thereby push the entire securing element 50 from the secured position to the release position for the purpose of automatically unlocking the mating aid 16.

As can be seen in FIG. 1, at least one locking section 56 can be spaced from at least one projection 70. According to an embodiment that is not shown, at least one locking section 56 can also be disposed at or on at least one projection 70.

Securing element 50 is connected in a motion-transmitting manner to a lever extension 72 that is movable relative to control lever 22. Lever extension 72 has a section 76 with a gripping surface and is therefore also used as a handle.

In the embodiment shown in FIG. 1, securing element 50 is monolithically connected to lever extension 72, in particular monolithically in one piece. In other words, lever extension 72 is an integral part of securing element 50.

According to a further possible embodiment of the invention, the mating aid 16 can be configured as a control slide which is arranged to be slidable on the connector housing 10. The control slide may be held on the connector housing 10 to be slidable transverse to the plugging direction, in particular perpendicular to the plugging direction. The control slide can then simplify the plugging process if, for example, the electrical connector 2 is difficult to access from the plugging direction. In such cases, the control slide can be pushed from a direction from which the electrical connector 2 is accessible. The pushing force on the at least one drive section 30 is converted into a force acting in the plugging direction, which drives the plugging process.

Lever extension 72 in release position 54 of securing element 50 protrudes from control lever 22 pointing away from connector housing 10. In particular, lever extension 72 in release position 54 of securing element 50 protrudes with respect to control lever 22 from the side of control lever 22 that is disposed opposite at least one projection 70. Lever extension 72 in release position 54 of securing element 50, in an embodiment, protrudes further from control lever 22 than it does in secured position 52 of securing element 50 (compare FIGS. 4 and 5). According to an embodiment not shown, lever extension 22 in secured position 52 of securing element 50 can even be entirely retracted into control lever 22.

In particular, the lever extension 72 can penetrate in a telescopic manner through the control lever 22 in the latter's longitudinal direction and be fully pushed in or retracted into the control lever 22 in the secured position of the securing element 50. In the release position of the securing element 50, the lever extension 72 can be pushed at least in part out from the control lever 22. This results, for example, in saving installation space in the delivery state of the housing assembly when the lever extension 72 in the secured position of the securing element 50 is pushed in.

The extension of the control lever 22 by the lever extension 72 occurs automatically when the electrical connector 2 is placed onto the mating connector 6 and the mating connector 6 there pushes the securing element 50 from the secured position to the release position over the at least one projection 70. Owing to this automatic extension of the control lever 22 by the lever extension 72 pushed out in the release position, a reduced mating force during the plugging process arises.

In other words, the housing assembly 10 can be configured such that the securing element 50 can be transferred from the secured position, which is advantageous in the delivery state in terms of installation space, to the pushed-out release position, wherein the securing element 50 in the pushed-out release position extends the lever arm of the control lever 22 for a reduced actuating force.

It can also be seen in FIG. 1 that securing element 50 is configured to be U-shaped or arc-shaped and engages around connector housing 10 (see FIG. 2). Securing element 50 has two locking sections 56 which are spaced from one another perpendicular to the plugging direction and which engage with corresponding locking grooves 60 of connector housing 10. In addition, securing element 50 has two projections 70 which are spaced from one another perpendicular to plugging direction 8, wherein projections 70 protrude with respect to connector housing 10 on oppositely disposed sides of mating aid 16.

Electrical connector 2 is shown in FIG. 2. Electrical connector 2 has housing assembly 1 according to the above description as well as one or more electrical contact elements. The contact elements are arranged in connector housing 10 and are configured for contacting one mating contact of mating connector 6 each.

FIG. 2 also shows connector assembly 4, which comprises electrical connector 2 and mating connector 6, in a separated state. In FIG. 3, electrical connector 2 and mating connector 6 are shown in a state of being plugged together at least in part. It can be seen that mating connector 6 rests against securing element 50 there. Mating connector 6 there has at least one stop 74 for at least one projection 70 of securing element 50. At least one stop 74 points in the direction opposite to plugging direction 8 and is accessible to at least one projection 70. For example, at least one stop 74 is formed by an edge 78 of mating socket 14 of mating connector 6.

Mating connector 6, in an embodiment, rests against securing element 50 that is in secured position 52 when mating aid 16 is disposed in initial position 18. In other words, mating connector 6 bears against securing element 50 at least prior to the drive motion being completed. In particular, mating connector 6 already bears against securing element 50 prior to drive sections 30 and driven sections 38 engaging.

Figure 4:
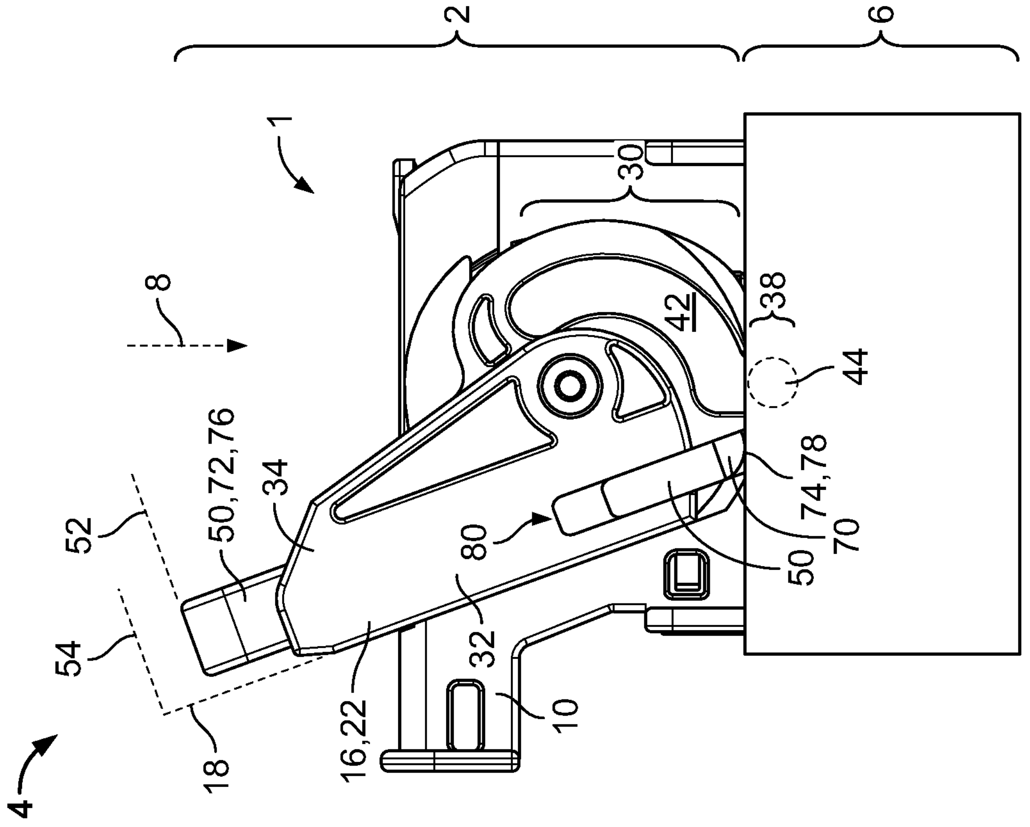
FIG. 4 is a side view of the connection assembly of FIG. 3.
Figure 7:
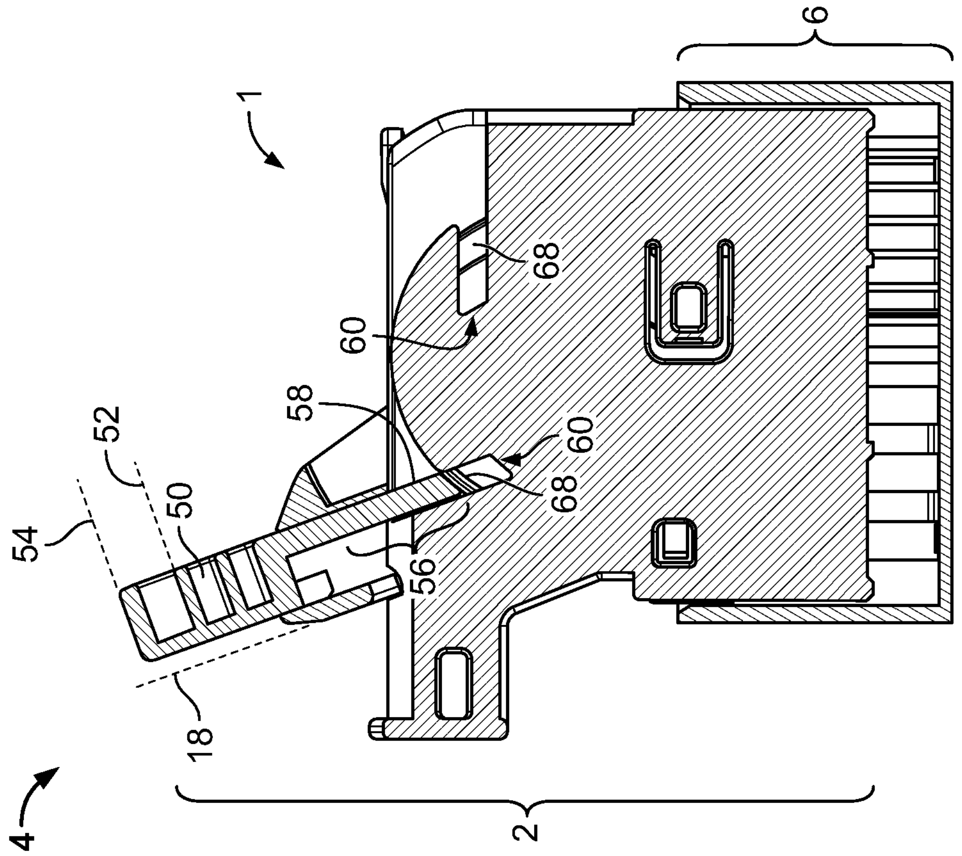
FIG. 7 is another sectional side view of the connection assembly of FIG. 3.

The sequence of a plugging process shall be explained hereafter with reference to FIGS. 4 to 9:

When electrical connector 2 is placed onto mating connector 6, at least one projection 70 comes into contact with at least one stop 74 (see FIG. 4). Once electrical connector 2 and mating connector 6 are plugged further together, for example, to make drive section 30 and driven section 38 engage with one another, at least one stop 74 presses onto at least one projection 70. This pressing is transferred to securing element 50 which consequently moves from secured position 52 to release position 54 (see FIG. 5).

When drive section 30 and driven section 38 are in engagement with one another and securing element 50 has reached release position 54, then previously secured (see FIG. 6) and now unlocked (see FIG. 7) mating aid 16 can be transferred from initial position 18 (see FIG. 7) to final position (see FIG. 8) in order to complete the plugging process by way of the drive motion. In other words, when drive sections 30 and driven sections 38 engage, a pivot motion of control lever 22 is converted by way of a rotational motion of drive sections 30 to a linear plugging motion between electrical connector 2 and mating connector 6.

Finally, securing element 50 is moved from release position 54 (see FIG. 8) back again to secured position 52 (see FIG. 9), wherein it secures mating aid 16 in final position 20.

Transferring securing element 50 from release position 54 back to secured position 52 can be done manually by the user or by a spring restoring force. To generate the spring restoring force, housing assembly 1 can have at least one spring element (not shown) which preloads securing element 50 in the direction of secured position 52.

During a separation process of electrical connector 2 from mating connector 6, mating aid 16 is correspondingly transferred back from final position 20 to initial position 18, wherein securing element 50 is moved possibly in advance manually from secured position 52 to release position 54.

Connector housing 10, mating aid 16, and securing element 50 can each be an injection molded member, in particular a plastic injection molded member.

The present invention provides a device as a plugging aid of a plug connection which can be operated in a space-saving manner and with little effort. The mating aid, which supports the complete plugging procedure of the electrical connector and the mating connector, can be secured or locked in a defined position (e.g. initial position and/or space-saving transport position) by the securing element. This means that the position of the mating aid does not change unintentionally, for example, during transport. Consequently, there is no need to pre-position the mating aid and/or the mating aid can be continuously transported and stored in a space-saving state.

The accessibility of the securing element also makes it possible for the mating connector to engage at the securing element in the initial phase of the plugging process and thereby push the securing element from the secured position to the release position. Consequently, the mating aid can be unlocked automatically if required and without any unnecessary additional manipulations, simply by placing the electrical connector onto the mating connector.

What is claimed is:

1. A housing assembly for an electrical connector that can be plugged together with a mating connector along a plugging direction, comprising:

a connector housing;

a mating aid arranged on the connector housing and movable between an initial position and a final position; and a securing element arranged on the mating aid and movable between a secured position and a release position, the mating aid has a drive section engaging the mating connector to move the mating connector into a state in which the mating connector is plugged together with the electrical connector, the securing element in the secured position engages the connector housing and in the release position is disengaged from the connector housing, the securing element in the secured position is accessible for the mating connector from outside of the housing assembly and is movable to the release position by the mating connector.

2. The housing assembly of claim 1, wherein the mating aid is secured in the initial position by the securing element disposed in the secured position.

3. The housing assembly of claim 1, wherein the mating aid is secured in the final position by the securing element disposed in the secured position.

4. The housing assembly of claim 1, wherein the securing element is movable with and relative to the mating aid.

5. The housing assembly of claim 1, wherein the securing element is guided at least in section in or at the mating aid.

6. The housing assembly of claim 1, wherein the mating aid is penetrated at least in sections by the securing element.

7. The housing assembly of claim 1, wherein the securing element is latchable in the secured position at the mating aid and/or at the connector housing.

8. The housing assembly of claim 1, wherein the securing element is latchable in the release position at the mating aid and/or at the connector housing.

9. The housing assembly of claim 1, wherein the mating aid is a control lever that is pivotable at the connector housing.

10. The housing assembly of claim 9, wherein the securing element is connected in a motion-transmitting manner to a lever extension that is movable relative to the control lever.

11. The housing assembly of claim 10, wherein the lever extension in the release position of the securing element protrudes at the control lever.

12. The housing assembly of claim 11, wherein the securing element is monolithically connected to the lever extension.

13. The housing assembly of claim 11, wherein the lever extension in the release position of the securing element protrudes further at the control lever than in the secured position of the securing element.

14. The housing assembly of claim 1, wherein the securing element and/or the mating aid is U-shaped at least in sections.

15. The housing assembly of claim 14, wherein the securing element and/or the mating aid engage around the connector housing at least in sections.

16. An electrical connector, comprising:

a housing assembly including a connector housing, a mating aid arranged on the connector housing and movable between an initial position and a final position, and a securing element arranged on the mating aid and movable between a secured position and a release position, the mating aid has a drive section engaging a mating connector to move the mating connector into a state in which the mating connector is plugged together with the electrical connector, the securing element in the secured position engages the connector housing and in the release position is disengaged from the connector housing, the securing element in the secured position is accessible for the mating connector from outside of the housing assembly and is movable to the release position by the mating connector; and an electrical contact element arranged in the connector housing.

17. A connector assembly, comprising:

an electrical connector including a housing assembly and an electrical contact element, the housing assembly has a connector housing, a mating aid arranged on the connector housing and movable between an initial position and a final position, and a securing element arranged on the mating aid and movable between a secured position and a release position, the mating aid has a drive section, the securing element in the secured position engages the connector housing and in the release position is disengaged from the connector housing, the electrical contact element is arranged in the connector housing; and a mating connector pluggable together with the electrical connector, the mating connector has a driven section engaging with the drive section of the mating aid, the drive section moves the mating connector into a state in which the mating connector is plugged together with the electrical connector, the securing element in the secured position is accessible for the mating connector from outside of the housing assembly and is movable to the release position by the mating connector, the mating connector bears against the securing element when the electrical connector and the mating connector are plugged together.

18. The connector assembly of claim 17, wherein, when the driven section of the mating connector engages the drive section of the mating aid, the securing element is automatically moved from the secured position to the release position.

* * * * *